United States Patent [19]

Berger

[11] 4,098,535
[45] Jul. 4, 1978

[54] LOAD CARRIER HAVING SUPPORTING LEGS

[76] Inventor: Gunvald Magnus Svante Berger, Helmfeltsgatan 4A, Malmo, Sweden, S-211 48

[21] Appl. No.: 730,170

[22] Filed: Oct. 7, 1976

[51] Int. Cl.² .............................................. B60P 1/64
[52] U.S. Cl. ................................... 296/35 A; 214/515; 280/763
[58] Field of Search ..................... 296/35 A; 214/515; 280/763, 764, 765, 766

[56] References Cited

U.S. PATENT DOCUMENTS

| 2,958,538 | 11/1960 | Norris et al. | 214/515 |
| 3,460,697 | 8/1969 | Cowlishaw et al. | 214/515 |

*Primary Examiner*—John A. Pekar

[57] ABSTRACT

A vehicle-cargo carrier unit, wherein the cargo carrier being provided with at least one supporting beam, extending in the longitudinal direction of the vehicle at a substantial distance from the longitudinal side edges of the vehicle, and supporting legs, which support the cargo carrier on the ground when the cargo carrier is not resting on the vehicle and which are pivotable to a horizontal position. In this horizontal position the legs are parallel with the beam and located between the cargo carrier and the vehicle inside the outer boundaries of the longitudinal side edges of the cargo carrier, and at least one supporting surface of each leg, located substantially in the same horizontal plane as the underside of the beam, supports the longitudinal sides of the cargo carrier on the vehicle.

6 Claims, 2 Drawing Figures

LOAD CARRIER HAVING SUPPORTING LEGS

The present invention relates to a load carrier provided with at least two supporting legs.

During recent years many cargo-carrying exchangeable deck systems with supporting legs mounted on the carrier have been developed. The known exchangeable deck systems are, however, burdened with one or more drawbacks, such as complicated construction and difficult handling, and the load carrier can often not be transported by different vehicles having different configurations of the surfaces supporting it.

The object of the present invention is therefore to at least partially circumvent the drawbacks with previously known systems and to provide a load carrier having the distinguishing features disclosed in the characterizing parts of the appended claims.

Figure 1:
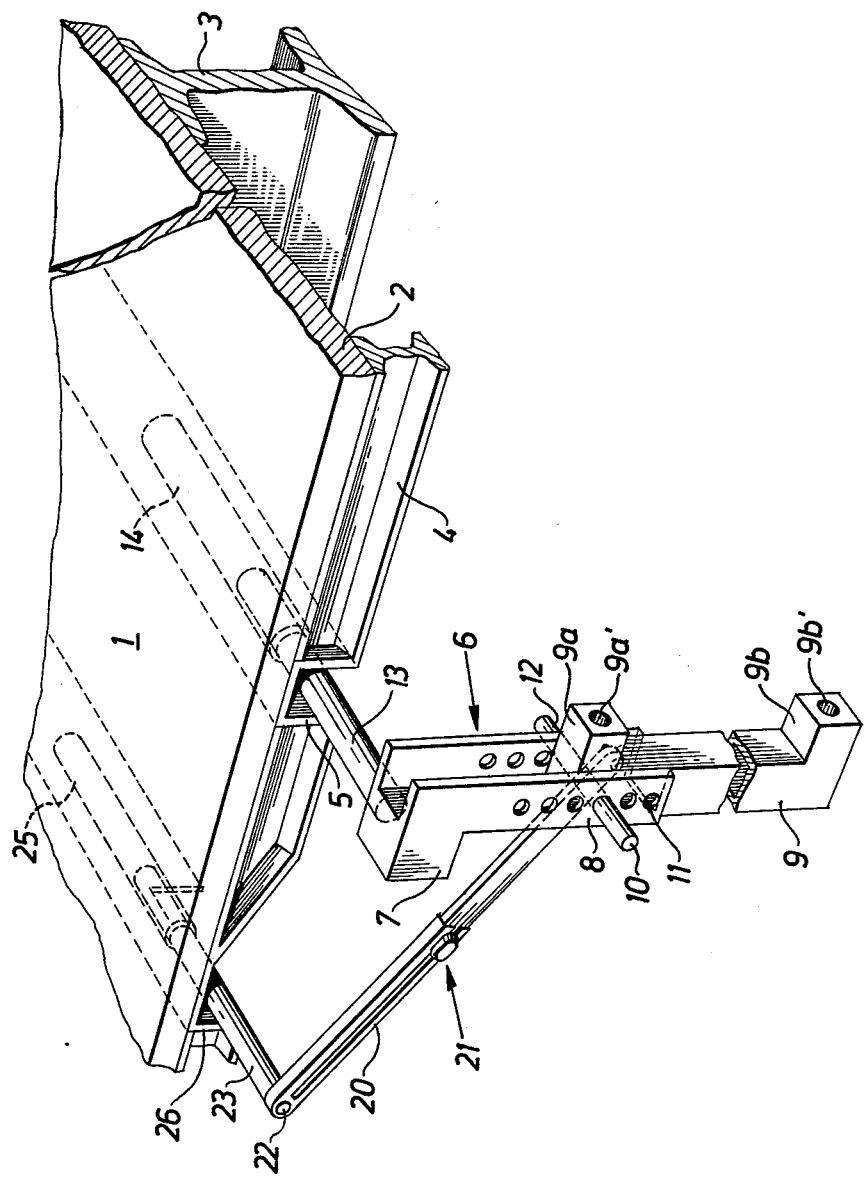
Figure 2:
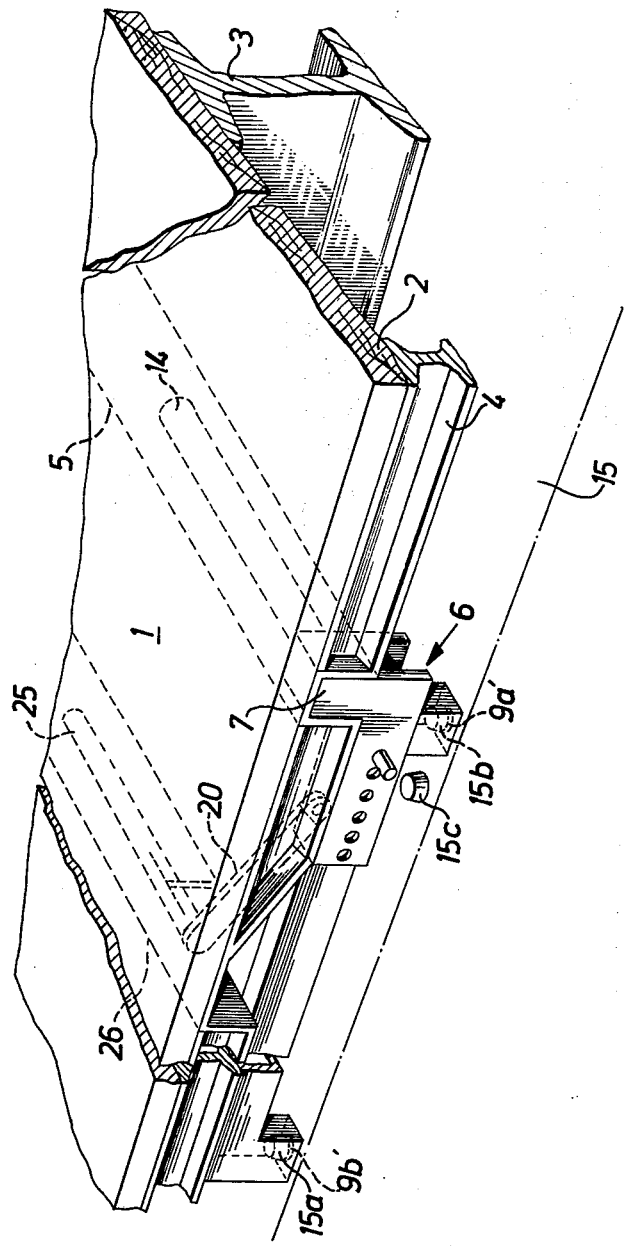

An embodiment of the invention will now be described in conjunction with the attached drawings, on which FIG. 1 is a schematic perspective view of a load carrier according to the invention, one of the supporting legs being shown in a folded-out position in which it supports the load carrier on the ground, and FIG. 2 is a schematic perspective view of the load carrier according to FIG. 1, the supporting leg being retracted beneath the load carrier, between it and a vehicle.

The load carrier shown on the figures is also suitable for handling by vehicles intended for load carriers provided with corner brackets according to ISO standards. It consists of a cargo deck but may just as well consist of a container or the like. The cargo deck, denoted by the numeral 1, consists of a deck, e.g. of wood, one or two heavy joists 3 (only one is shown) extending in the longitudinal direction of the deck at a large distance from the side edges of the deck and intended for solid attachment to a vehicle with the help of locking means (not shown) to prevent the deck moving relative the vehicle during transport, smaller joists 4 (only two are shown) along the side edges of the vehicle and a plurality of channels 5 (only one shown) extending at right angles to and connecting the joists 3 and 4 to each other.

Each supporting leg 6, situated at one of the four corners of the deck, consists of a parallel box-like upper portion 7, a portion 8 in the shape of a channel projecting from it, the channel toes facing right in FIG. 1 and downwards in FIG. 2, and a lower part or post 9 forming the leg itself, with its bottom resting against the ground in FIG. 1. The post 9, consisting of a square-section hollow tube, is telescopically arranged in the channel 8 for displacement in it, and can be locked in any of several positions to the channel by means of a rod 10, which is introduced into any of several pairs of holes 11 in the channel 8 and in a through-hole 12 in the upper portion of the post 9. Instead of the post 9 being telescopically arranged in the channel 8, the post can be made so that the channel 8 is telescopically arranged in it instead. As is apparent from FIG. 1, three sides of the upper portion of the post 9 always engage against the inside of the channel, and a part of the upper portion of the post is above the pivoting point (at the rod 10) between the post and the channel, thus not allowing any relative rotation between the post and channel to arise, signifying that the parts 8 and 9 form a rigid joint when the rod 10 is inserted in the holes 11 and 12.

The upper portion 7 of the supporting leg 6 is provided to the left in FIG. 1 with a bar 13 at the part of the upper portion 7 facing towards the deck 1. The bar is entirely or partially withdrawably arranged in a tube 14 welded to the crossbeam 5, the inner diameter and length of the tube negligibly exceeding those of the bar 13. In the case where the bar and thereby the leg are completely withdrawable, the advantage is obtained that the entire leg can be removed from the deck 1. The opening of the tube 14 facing towards the side edge of the deck 1 is situated at a distance from this side edge which is equal to the width of the upper portion 7 transversely to the deck. Depending on this, on the bar 13 being attached centrally to the left part of the upper portion in FIG. 1 and on the inner dimensions of the channel 5 being negligibly greater than the dimensions of the part of the upper portion 7 on which the bar 13 is attached, the bar exactly fits into the space defined by the channel 5 and the tube 14 when the leg 6 assumes a horizontal position (FIG. 2). With the leg 6 in a vertical position (FIG. 1) it can be placed at different distances from the side edge of the deck 1 depending on ground conditions and vehicle width.

The supporting leg 6 is further provided with a number of holes, viz. a hole 9a' and a hole 9b' which have no function when the leg assumes the vertical position in FIG. 1, but when the leg assumes the horizontal position shown in FIG. 2, wherein the upper portion 7 is inserted in the channel 5, they coact with upwardly directed locating pins 15a and 15b on the longitudinal side edges of the vehicle. The holes 9a' and 9b' are, as is apparent from FIG. 1, accommodated in supporting bosses 9a and 9b on the post 9. The supporting surfaces provided with the holes 9a' and 9b' of these supporting bosses are situated in the same plane which aligns with the bottom surface of the lower flange of the joist 3 when the leg assumes the position shown in FIG. 2, for which reason all of these supporting surfaces will engage against the substructure 15 (usually longitudinal beams on the vehicle chassis) and carry or support the deck 1, thereby preventing it from tipping around a longitudinal central axis through the joist or joists 3. By providing the supporting bosses 9a and 9b, the channels 5 and joists 4 can be made slighter while the deck can still carry the same load, and the use on the deck of special corner brackets independent of the supporting legs is avoided. The locating pins 15a, b, c on the vehicle on which the deck 1 rests are arranged at a predetermined distance from each other, and since the post 9 is adjustable in different positions relative to the upper portion 8, this adjustment can be made so that at least one of the holes 9a' and 9b' coact with one of the pins. It should also be mentioned that the pins 15a, b, c do not necessarily have to be arranged on a truck deck, but can be arranged on a railway wagon or on any substructure whatsoever on which the deck 1 rests. The pins 15a, b, c can also be made as locking bolts for fixing the deck 1 to the substructure.

To enable the supporting leg 6 to remain in the substantially vertical position in FIG. 1, a strut 20 is mounted between the upper portion of the leg and the joist 4. The strut 20, which is parted substantially at its middle (at 21), is provided with an automatically acting locking device, known per se, although not shown in the figure, which is for example of the kind used for autombile boots and is lockable in its extended position shown in FIG. 1. One end of the strut is pivotably mounted on the channel 8 and its other end is non-pivotably attached to a bar 23 similar to the bar 13, rotatably mounted and displaceable in a tube 25 welded to the channel 26. It will be understood that when the leg 6 and the strut 20 assume the position shown in FIG. 1, not only the rotary movement of the leg about the axis of the bar 13 is prevented, but also that the weight of the load carried by the deck 1 counteracts bending loads on the strut, since the pivoting axis of the leg at the deck is situated above and to the left of the point where the post 9 is in contact with the ground and not, as is usual, directly above said point. When the deck is set up on the supporting legs, the struts 20 are thus only exposed to tensional load, which means that the strut can have considerably lighter dimensions than the conventional struts which are exposed to, and must take up, large bending stresses when the deck is exposed to compressive loads, e.g. by a fork truck, in its longitudinal direction, and these bending stresses increase with increased load.

The way in which the supporting leg according to the invention is used during loading will now be summarily described. It is here assumed that the four legs in each corner of the deck are folded down and locked in the position shown in FIG. 1, whereby they support the deck 1 on the ground and allow a vehicle, e.g. a lorry, to back in between the legs in the longitudinal direction of the deck. After the vehicle has been backed in so far under the deck 1 that a fender or the like on the vehicle prevents further backing, the deck is lifted by lifting means mounted on the vehicle sufficiently for the legs to be free from the ground. Thereafter the strut locking means at 21 are actuated so that the struts 20 can be telescoped, and each leg is subsequently turned 90° (clockwise in FIG. 1) so that the leg assumes a horizontal position, and the bars 13 and 23 can be pushed in under the deck so that the upper portion 7 is introduced into the space in the channel 5, and the outer side of the leg will be parallel with the side edge of the deck, partly so that it will not be in the way during subsequent transport and partly to serve as support for the deck when the lifting means is once again actuated to lower the deck onto the vehicle. The strut 20 is also in its completely retracted position within the boundaries of the deck 1 and does not hinder subsequent transport. Where it is found to be necessary, either so that any of the holes 9a' or 9b' shall fit a locating pin 15a, b or c or so that the bosses 9a and 9b shall straddle a mudguard on a vehicle where the joist 3 can be partly below the upper level of the mudguards, the position of the post 9 is adjusted in relation to the channel 8 by withdrawing the rod 10 from the holes 11 and 12 and moving the post 9 along the channel 8 whereafter the rod 10 is inserted in other holes 11 and the hole 12. Since the post 9 is displaceable relative to the channel 8, allowance can also be made for the bosses 9a, 9b to be adjusted in the longitudinal direction of the vehicle so that the cargo weight is distributed evenly over the vehicle, and also so that two load carriers can be connected together by means of these bosses. When lowering has been completed, the supporting bosses 9a and 9b now engaging against the vehicle and at least one of the holes 9a' or 9b' coact with at least one of the pins 15a, b or c and the joists 3 rest on the vehicle, the joists 3 can be locked to the vehicle by means of suitable conventional locking means and transport can be initiated. If the vehicle, such as a railway wagon or a lorry provided with a carrying frame according to ISO standard 70014, lacks such locking means, there is ensured good attachment of the deck even so, because of the holes 9a', 9b' and the locating pins, which pins can constitute locking bolts.

Even if only one embodiment of the invention has been described above and shown on the drawings, the invention is not limited to this embodiment but only by what is set forth in the appended claims.

I claim:

1. A cargo carrier unit for a vehicle including a longitudinally extending support surface having longitudinal side edges, said cargo carrier unit being provided with at least two supporting legs and at least one supporting beam extending longitudinally of the vehicle support surface at a substantial distance inwardly of the longitudinal side edges thereof, said supporting beam extending downwardly from the cargo carrier more than any other supporting elements thereon and having an undersurface resting on the vehicle support surface, means mounting the supporting legs for pivotal movement from a substantially vertical position wherein they support the cargo carrier unit on the ground to a substantially horizontal position wherein they are on either side of and mainly parallel with the beam, means mounting the supporting legs for movement between an extended position outwardly of a longitudinal side edge of the support surface and a retracted position between the cargo carrier unit and the vehicle immediately inside the outer boundaries of the longitudinal side edges of the cargo carrier unit when said legs are in said horizontal position, and each supporting leg being provided with at least one bearing surface supporting the longitudinal sides of the cargo carrier unit on the vehicle support surface, the bearing surfaces of said legs being in substantially the same horizontal plane as the underside of the beam.

2. A cargo carrier as claimed in claim 1, characterized in that each supporting leg comprises a lower first portion coacting with the ground and telescopically displaceable relative to an upper second portion united to the vehicle, and that at least one of the first and second portions are provided with said at least one bearing surface.

3. A cargo carrier as claimed in claim 1, characterized in that the bearing surface is provided with locking means which, when the supporting leg assumes the horizontal position, coact with corresponding means on the vehicle for locking the cargo carrier to the vehicle.

4. A cargo carrier is claimed in claim 3, characterized in that the locking means comprises holes which coact in the horizontal position of the supporting leg with locking bolts attached to the vehicle.

5. A cargo carrier as claimed in claim 1, characterized in that the bearing surface is made on a projection on the supporting leg.

6. A cargo carrier as claimed in claim 1, characterized in that the maximum thickness of each supporting leg at the supporting surface is substantially the same as the vertical distance between the underside of the beam and the lower portions of the cargo carrier situated at the longitudinal side edges of the vehicle.

* * * * *

UNITED STATES PATENT AND TRADEMARK OFFICE
CERTIFICATE OF CORRECTION

PATENT NO. : 4,098,535
DATED : July 4, 1978
INVENTOR(S) : Gunvald Magnus Svante

It is certified that error appears in the above-identified patent and that said Letters Patent are hereby corrected as shown below:

Claim 4, line 1, "is claimed" should be -- as claimed --.

Claim 6, line 2, "at the supporting surface" should be omitted.

Signed and Sealed this

Twenty-third Day of January 1979

[SEAL]

Attest:

RUTH C. MASON
Attesting Officer

DONALD W. BANNER
Commissioner of Patents and Trademarks

UNITED STATES PATENT AND TRADEMARK OFFICE
CERTIFICATE OF CORRECTION

PATENT NO. : 4,098,535
DATED : July 4, 1978
INVENTOR(S) : Gunvald Magnus Svante Berger It is certified that error appears in the above-identified patent and that said Letters Patent are hereby corrected as shown below:

Claim 4, line 1, "is claimed" should be --as claimed--.

Claim 6, line 2, "at the supporting surface" should be omitted.

This certificate supersedes Certificate of Correction issued January 23, 1979.

Signed and Sealed this

Eighth Day of May 1979

[SEAL]

Attest:

RUTH C. MASON
Attesting Officer

DONALD W. BANNER
Commissioner of Patents and Trademarks